(12) United States Patent
Sugimoto et al.

(10) Patent No.: US 6,543,924 B2
(45) Date of Patent: Apr. 8, 2003

(54) VEHICLE LAMP AND ROTARY DRIVING APPARATUS

(75) Inventors: Atsushi Sugimoto, Shizuoka (JP); Keiichi Tajima, Shizuoka (JP); Kazuma Mochizuki, Shizuoka (JP); Masanori Nishigaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/990,683

(22) Filed: Nov. 21, 2001

(65) Prior Publication Data

US 2002/0064054 A1 May 30, 2002

(30) Foreign Application Priority Data

Nov. 24, 2000 (JP) .......................................... 2000-358007

(51) Int. Cl.$^7$ .............................................. F21V 21/14
(52) U.S. Cl. ...................................... 362/523; 362/271
(58) Field of Search ................................. 362/523, 524, 362/530, 272, 271, 269, 286, 287, 289, 285

(56) References Cited

U.S. PATENT DOCUMENTS

| | | | | |
|---|---|---|---|---|
| 4,353,110 A | * | 10/1982 | Ellis | 362/35 |
| 4,663,696 A | | 5/1987 | Miyazawa et al. | 362/465 |
| 4,827,388 A | | 5/1989 | Miyazawa | 362/526 |
| 4,831,506 A | | 5/1989 | Miyazawa | 362/526 |
| 4,833,573 A | * | 5/1989 | Miyauchi et al. | 362/466 |
| 5,412,543 A | | 5/1995 | Kobayashi | 362/524 |

* cited by examiner

Primary Examiner—Sandra O'Shea
Assistant Examiner—Hargobind S. Sawhney
(74) Attorney, Agent, or Firm—Fish & Richardson P.C.

(57) ABSTRACT

A vehicle lamp including an optical means having a light source to be rotated by the driving unit having a driving source. The driving unit is provided with a rotational position detecting means including a base member and a rotating body being rotatable with respect to the base member for supplying signals corresponding to the rotational position of the rotating body with respect to the base member of the rotating body, and the optical means and rotating body of the rotational position detecting means are connected by clutch means.

8 Claims, 7 Drawing Sheets

VEHICLE LAMP AND ROTARY DRIVING APPARATUS

BACKGROUND OF THE INVENTION

1. Field of the Invention

The present invention relates to a novel vehicle lamp and a rotary driving apparatus. More specifically, the present invention relates to an apparatus including a rotational position detecting means for detecting the rotational position of a driving source for rotating optical means and of the optical means. The rotational position detecting means can accurately detect the rotational orientation of the optical means.

2. Description of the Related Art

There is a vehicle lamp including a light source and optical means such as a reflector, and a lamp body. The direction of irradiation is changed by rotating the light source.

When the optical means is rotated by remote control, detecting the rotational position of the optical means becomes necessary. To detect the rotational position, it is conceivable to employ a base member and a rotating body that rotates with respect to the base member and a potentiometer to supply signals according to the rotational angle of the rotating body with respect to the base member.

To detect the rotational position of the optical means accurately, the position of the optical means should coincide with that of the rotating body of the rotational position detecting means. In other words, when the optical means is at the neutral position, the rotating body should be located at the position where the rotational position detecting means supplies a neutral position signal.

SUMMARY OF THE INVENTION

Accordingly, it is an object of the present invention to enable the positional adjustment between the optical means and the rotating body of the rotational position detecting means after assembly.

The vehicle lamp of the present invention includes optical means including a light source to be rotated by the driving unit having a driving source. The driving unit is provided with a rotational position detecting means including a base member and a rotating body being rotatable with respect to the base member for supplying signals corresponding to the rotational position of the rotating body with respect to the base member. The optical means and the rotating body of the rotational position detecting means are connected by clutch means.

Therefore, the position of the optical means with respect to the rotating body of the rotational position detecting means can be adjusted after assembling the driving unit and the optical means, for example, by fixing the rotating body of the rotational position detecting means to the position where a neutral position signal is supplied, disconnecting the connection between the rotating body and the optical means by the clutch means, rotating the optical means to the neutral position, and subsequently connecting between the optical means and the rotating body of the rotational position detecting means again by the clutch means.

DETAILED DESCRIPTION OF THE PREFERRED EMBODIMENTS

Referring now to the drawings, an embodiment of the vehicle lamp according to the present invention will be described.

The vehicle lamp 1 includes a lamp body 3 rotatably supported by a bracket 2 fixed on the vehicle body. The bracket 2 includes two supporting arms 4, 5 opposing at a distance vertically with each other, and a lamp body 3 is rotatably supported at the tips of the supporting arms 4, 5. More specifically, a shaft 6 projects from the upper surface of the lamp body 3, and the shaft 6 is inserted into the insertion hole 7 formed at the center of the upper supporting arm 4, and a securing washer 8 is engaged on the portion of the shaft 6 projecting upwardly from the insertion hole 7. Thus, the upper portion of the lamp body 3 is rotatably supported by the supporting arm 4. The lamp body 3 is formed with a connecting hole 9 opened at the bottom portion thereof. The connecting hole 9 is formed with grooves 9a extending in the axial direction for positioning in the direction of rotation. The connecting hole 9 is faced downward through the insertion hole 10 formed at the tip portion of the lower supporting arm 5 (See FIG. 1).

A driving unit 11 is fixed on the lower side of the lower supporting arm 5 of the bracket 2. The driving unit 11 is constructed so that required members and components are accommodated in or supported by the case body 12 respectively. Fixing strips 13, 13 project from the side surfaces of the case body 12, and fixing screws 14, 14 inserted through the fixing trips 13, 13 from below are engaged with the fixing bosses 15, 15 projecting from the lower surface of the supporting arm 5, thereby fixing the driving unit 11 below the lower supporting arm 5 of the bracket 2 (See FIG. 1).

Figure 1:
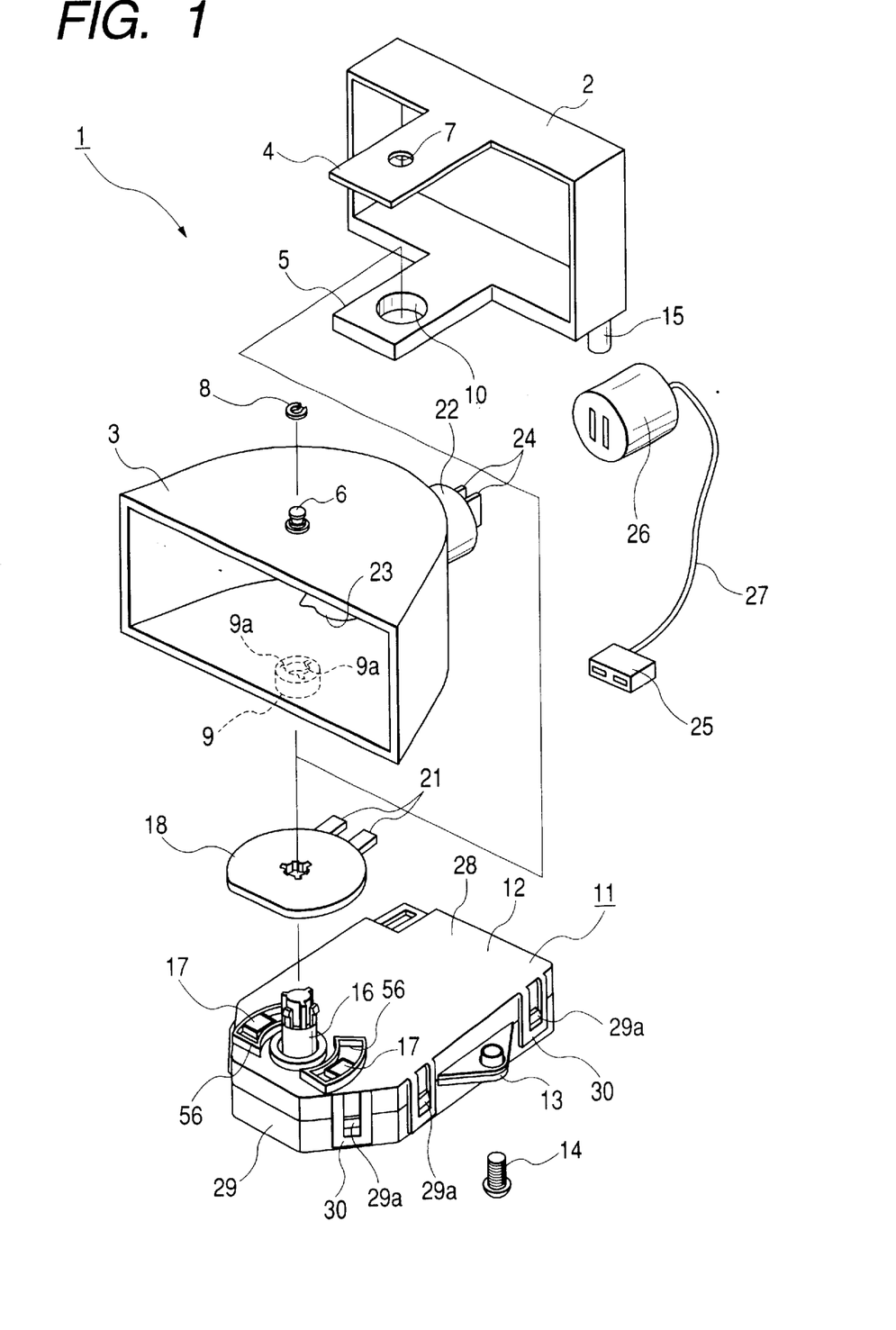
FIG. 1 is a general exploded perspective view according to an embodiment of the invention.

A revolving shaft 16 projects from the upper surface of the case body 12 of the driving unit 11, and fixed contact points 17 are disposed at the position near the revolving shaft 16 (See FIG. 1). These fixed contact points 17 are connected to the power source. In other words, one of the fixed contact points 17 is connected to the battery via a lighting switch, which is not shown, and the other one is grounded.

The revolving shaft 16 is connected to the connecting hole 9 opened on the lower surface of the lamp body 3 through the insertion hole 10 formed on the lower supporting arm 5 of the bracket 2. A contact plate 18 is mounted on the revolving shaft 16 on the portion located below the supporting arm 5. The lower surface 19 of the contact plate 18 is formed with rotary contact points 20 being arced-shape on both sides of the central portion (See FIG. 4), and when the contact plate 18 is mounted on the revolving shaft 16, the rotary contact points 20 are brought into contact with the fixed contact points 17 respectively. Connector pins 21 connected to the rotary contact points 20 project from the rear end of the contact plate 18 (See FIG. 1).

A light source bulb 23 is mounted at the rear portion of the lamp body 3 via a bulb socket 22 that is detachable with respect to the lamp body 3, and connector pins 24 projecting from the rear end of the bulb socket 22 and the connector pins 21 projecting from the contact plate 18 are electrically connected via the power supply cable 27 having connectors 25, 26 at both ends thereof (See FIG. 1). Therefore, since the light source bulb 23 is connected to the power supply via the fixed contact points 17, 17, the rotary contact points 20, and the power supply cable 27, and the rotary contact points 20 slides with respect to the fixed contact points 17, even when the lamp body 3 rotates, the relation of connection from the power source to the light source bulb 23 is not disconnected.

In the vehicle lamp 1 described above, when the driving unit 11 is driven and the revolving shaft 16 rotates, the lamp body 3 mounted on the drive shaft 16 rotates, and the direction of irradiation varies in the horizontal direction. Even when the lamp body 3 rotates in this way, the power supply cable 27 rotates with the lamp body in its entirety Thus, no kinking of the power supply cable 27 occurs, and no stress is exerted on the power supply cable 17 with rotation of the lamp body 3.

The vehicle lamp 1 can be used in various way, such that a transparent cover or a lens is mounted at the front opening of the lamp body 3 and used as an independent lamp, or it is combined and used with a different lamp and mounted in a large sized lamp housing.

Figure 2:
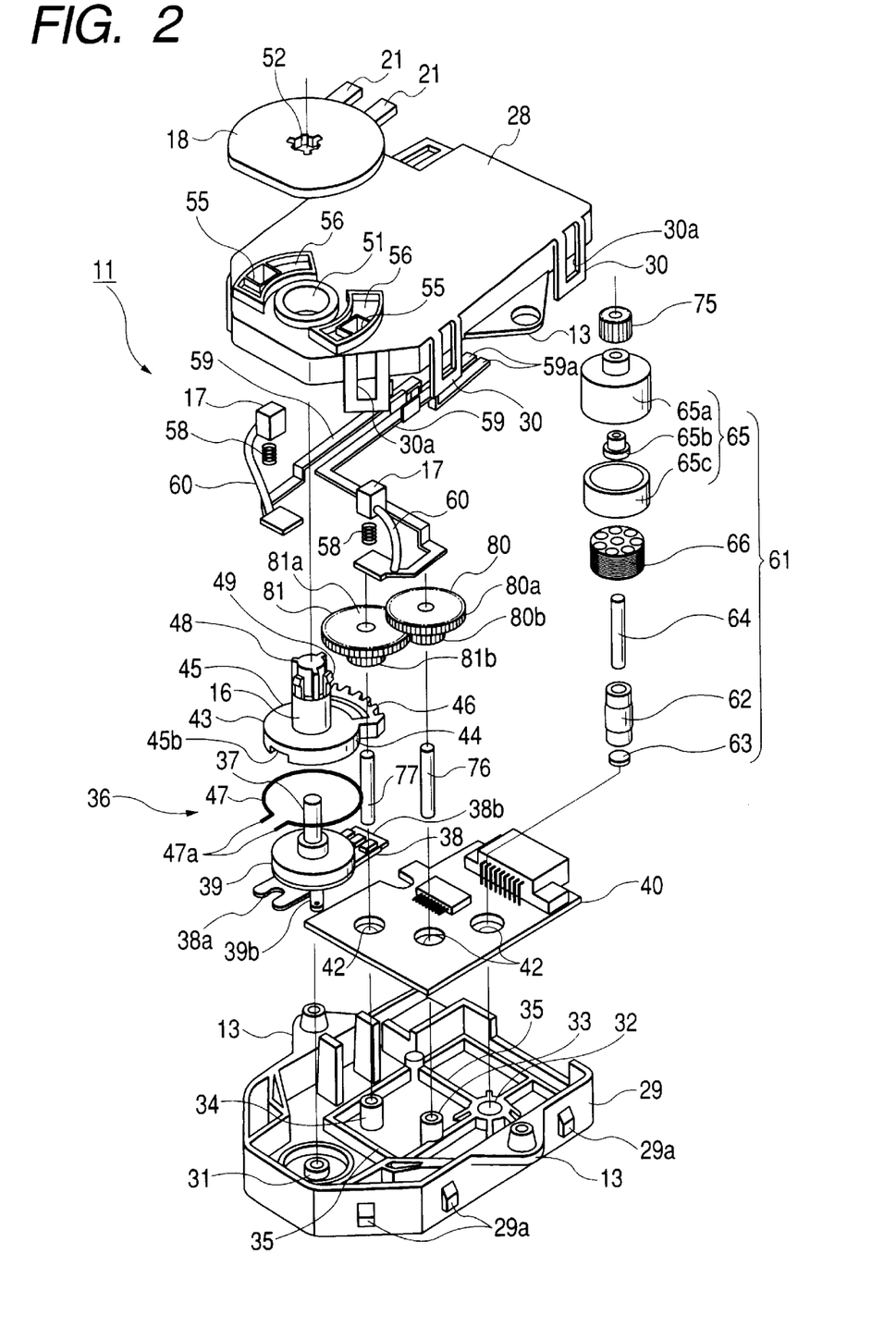
FIG. 2 is an exploded perspective view of a driving unit according to an embodiment of the invention.

Referring mainly to FIG. 2, the driving unit 11 will be described.

The driving unit 11 is constructed of the required members or components arranged or supported in the case body 12. The case body 12 includes an upper half 28 and the lower half 29 connected with each other. Connecting strips 30, 30, ... project downward from the peripheral edge of the upper half 28, and the connecting strips 30 are formed with engaging holes 30a. The lower half 29 comprises engaging projections 29a projected on the side surface, and the upper and lower halves 28, 29 are connected by engaging the engaging projections 29a of the lower half 9 with the engaging holes 30a of the connecting strips 30 with the side wall of the upper half 28 and that of the lower half 29 abutted against with each other so that the case body 12 is formed (See FIG. 12).

The bottom surface of the lower half 29 is formed of bosses 31, 32, 33, 34 for receiving a shaft, and a rib 35 for placing a board (See FIG. 2).

The boss 31 for receiving a shaft receives the fixed shaft 37 of the potentiometer 36 so as to stand upward therefrom. The potentiometer 36 includes a baseboard 38, a rotary disk 39, and the fixed shaft 37, which is fixed on the baseboard 38. The rotary disk 39 is rotatably supported by the fixed shaft 37 in a state of being in contact with the upper side of the baseboard 38 (See FIG. 3). A variable resistor is constructed by a resistive conductor not shown formed on the baseboard 38 and a bridging contact, not shown, formed on the rotary disk 39, so that the value of resistance corresponding to the angle of rotation of the rotary disk 39 with respect to the baseboard 38 is supplied.

Figure 3:
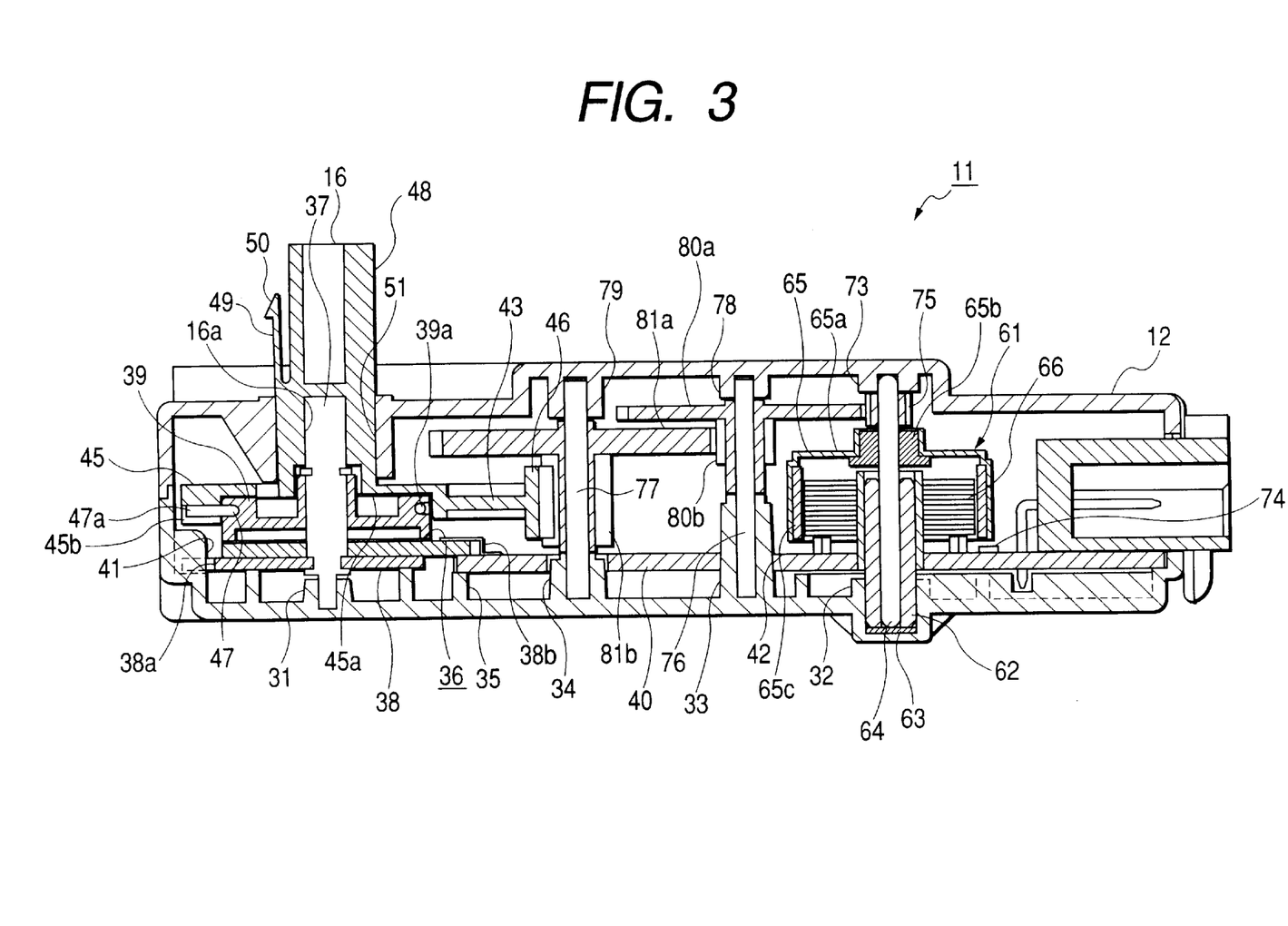
FIG. 3 is a cross sectional view of a driving unit taken along the shaft of each gear according to an embodiment of the invention.

An engaging notch 38a is formed at one end of the baseboard 38 and a connecting terminal 38b is formed at the other end of the baseboard 38 (See FIG. 2 and FIG. 3).

A groove 39a is formed on the outer peripheral surface of the rotary disk 39, and a projection 39b for adjustment having a hole projects from the side surface of the rotary disk 39 (See FIG. 2 and FIG. 3).

The portion of the fixed shaft 37 of the potentiometer 36 near the lower end is calked and fixed to the baseboard 38, and the portion of the fixed shaft 37 projecting downward from the baseboard 38 is press fitted into the boss 31 for receiving the shaft formed on the lower half 29 (See FIG. 3). The connecting terminal 38b is connected to the prescribed conductor on the printed board 40, and the engaging notch 38a is engaged with the positioning projection 41 formed on the lower half 29, so that the orientation of the baseboard 38 with respect to the lower half 29 is defined (See FIG. 2, FIG. 3).

The printed board 40 is placed on the rib 35 for placing a board formed on the lower half 29. The printed board 40 is formed with insertion holes 42 at the positions corresponding to the bosses 32, 33, and 34 for receiving the shaft respectively (See FIG. 2, FIG. 3).

An output rotating member 43 is rotatably supported by the fixed shaft 37 of the potentiometer 36. The output rotating member 43 is formed with the revolving shaft 16 integrally projecting from the center of the output gear portion 44, and the output gear portion 44 includes a disk portion 45 and a sector gear 46 projected from the side surface of the disk portion 45 formed integrally with each other (See FIG. 2).

The lower surface of the disk portion 45 of the output gear portion 44 is formed with a circular recess 45a. The rotary disk 39 of the potentiometer 36 is positioned within the recess 45a. The lower peripheral edge of the disk portion 45 is formed with an engaging notch 45b in communication with the recess 45a. The revolving shaft 16 is formed with a supported hole 16a opening toward the recess 45a. The fixed shaft 37 of the potentiometer 36 is rotatably inserted into the supported hole 16a. Thus, the output rotating member 43 is rotatably supported by the fixed shaft 37 of the potentiometer 36 (See FIG. 3).

A connecting spring 47 is interposed between the rotary disk 39 of the potentiometer 36 and the disk portion 45 of the output gear portion 44 as clutch means. The connecting spring 47 is formed by curving a linear spring material into ring-shape and bending both ends 47a outward so as to be parallel with each other (See FIG. 2).

The diameter of the connecting spring 47 before assembly is smaller than that of the groove 39a formed on the rotary disk 39 of the potentiometer 36. Therefore, when it is engaged in the groove 39a, it tightens the groove 39a by its resiliency, and both ends 47a engage with the engaging notch 45b of the disk portion 45 of the output gear portion 44 (See FIG. 3). Accordingly, rotation of the output gear portion 44 is transmitted to the connecting spring 47, and rotation of the connecting spring 47 is transmitted to the rotary disk 39 by friction between the connecting spring 47 and the rotary disk 39. Therefore, when one of the output gear portion 44 and the rotary disk 39 rotates with rotation of the other one restrained, slippage occurs between the connecting spring 47 and the rotary disk 39.

The upper half of the revolving shaft 16 formed integrally with the output gear portion 44 is formed with projecting ridges 48 extending in the axial direction at regular intervals in the circumferential direction, and engaging arm strips 49 between these projecting ridges 48 (See FIG. 2). The engaging arm strip 49 extends in the axial direction at a distance from the outer peripheral surface of the revolving shaft 16, the lower end of which is connected to the revolving shaft 16 and the upper end of which is a free end. The upper end of the engaging arm strip 49 is at the position lower than the upper end of the revolving shaft 16, and the upper end is formed with an engaging claw 50 projecting outward (See FIG. 3).

The upper half 28 is formed with an shaft-insertion hole 51 (See FIG. 2 and FIG. 3), and the upper half of the revolving shaft 16 projects upward from the shaft-insertion hole 51 (See FIG. 3).

Figure 4:
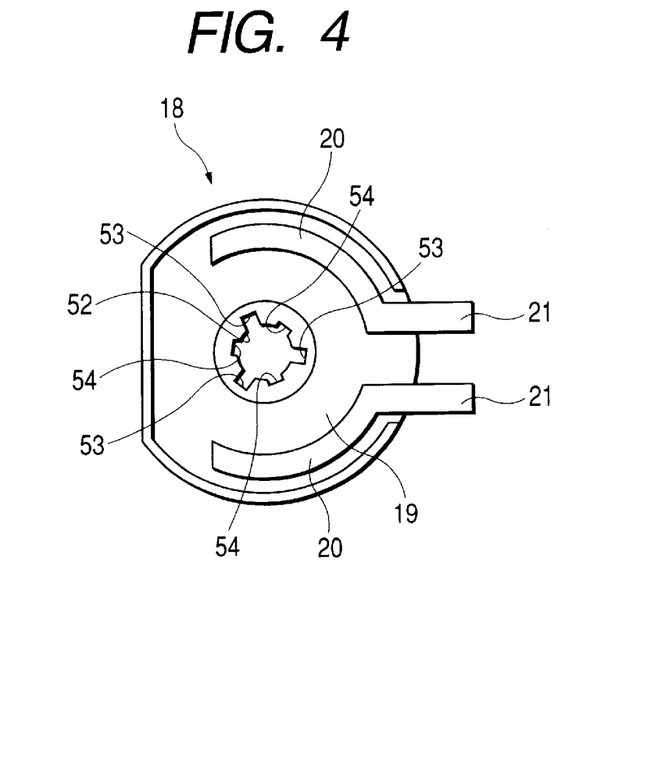
FIG. 4 is an enlarged bottom view of a contact plate according to an embodiment of the invention.

The connecting hole 52 is formed at the center of the contact board 18, and the connecting hole 52 is formed with insertion notches 53 at regular intervals in the circumferential direction, and engaging notches 54 are formed between these insertion notches 53 (See FIG. 2 and FIG. 4).

The revolving shaft 16 is inserted into the connecting hole 52 on the contact board 18. Concurrently, the relative position in the direction of rotation of the contact board 18 with respect to the revolving shaft 16 is defined by the projecting ridges 48 of the revolving shaft 16 inserted into the insertion notches 53 of the contact board 18. When the bevels of the engaging claws 50 of the engaging arm strips 49 are pressed by the back edges of the engaging notches 54 of the contact board 18, the upper end portions of the engaging arm strips 49 bow toward the center of the revolving shaft 16. Then, the engaging notches 54 are released downward from the engaging claws 50, and subsequently, bowed engaging arm strips 49 return to the original positions, and then their engaging claws 50 engage with the engaging notches 54 of the contact board 18. Thus, the contact board 18 is prevented from falling off the revolving shaft 16, and the maximum height of the is contact board 18 with respect to the revolving shaft 16 is defined.

The portion of the revolving shaft 16 projecting upward from the contact board 18 is inserted into the insertion hole 10 formed on the lower supporting arm 5 of the bracket 2 and fitted into the connecting hole 9 of the lamp body 3. Concurrently, the relative position in the direction of rotation of the lamp body 3 with respect to the revolving shaft 16 is defined by the projecting ridges 48 of the revolving shaft 16 being engaged with the grooves 9a of the connecting hole 9.

A brush-insertion holes 55 are formed at the positions of the upper half 28 of the case body 12 corresponding to both sides of the shaft-insertion hole 51. A recess 56 are formed in such a manner that they surround the brush-insertion holes 55.

Figure 5:
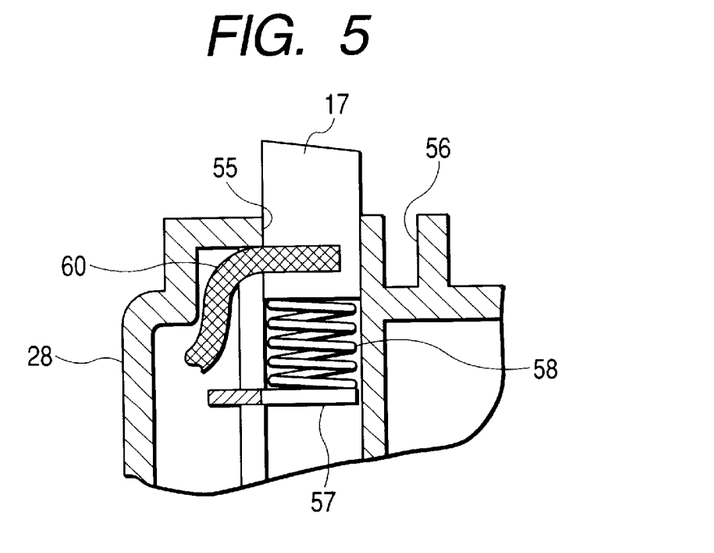
FIG. 5 is an enlarged cross sectional view showing a fixed contact point according to an embodiment of the invention.

Generally prism shaped brushes are slidably inserted into the brush-insertion holes 55 on the upper half 28 as the fixed contact points 17. Supporting walls 57 are formed on the inside of the upper half 28 at the positions opposing to the brush-insertion holes 55, and coil springs 58 are interposed between the supporting walls 57 and the brushes 17 (See FIG. 5). Accordingly, the brushes 17 are brought into resilient contact with rotary contact points 20 formed on the contact board 18, which ensures electrical connection between the brushes (fixed contact points) 17 and the rotary contact points 20. Since the maximum height of the contact board 18 with respect to the revolving shaft 16 is defined by the engagement between the engaging claws 50 of the engaging notches 54 and the engaging arm strips 49 of the revolving shaft 16, the maximum height thereof with respect to the brushes 17, 17 supported by the case body 12 as well as the revolving shaft 16 is also defined. This prevents the occurrence of defective contact between the brushes 17 and the fixed contact points 20.

Conductive boards 59 formed of conductive metal plate are supported on the inner surface of the upper half 28. One of the ends of the conductive boards 59 is connected to the brushes 17 by wires 60. The other ends 59a of the conductive boards 59 serve as contacts for a connector, and thus the conductive boards 59 are connected to the power supply via the connector, not shown. In other words, one of the conductive boards 59 is connected with the buttery via the lighting switch, not shown, and the other one is grounded.

A brushless motor 61 is disposed in the case body 12 as a driving source. The lower end of a bearing sleeve 62 is press fitted in the boss 32 for receiving a shaft 32 of the lower half 29. A thrust bearing 63 is fitted on the bottom of the boss hole of the boss 32 for receiving a shaft 32 (See FIG. 2 and FIG. 3).

The bearing sleeve 62 rotatably supports the revolving shaft 64. A rotor 65 is fixed on the revolving shaft 64. The rotor 65 includes a rotor case 65a in the shape of a cylinder closed on the upper surface and short in the axial length, a rotor boss 65b fixed at the center of the upper end portion of the rotor case 65a, and a rotor magnet 65c fixed on the inner peripheral surface of the rotor case 65a alternately magnetized in the circumference direction, A rotor boss 65b is press fitted in the portion projecting from the upper end of the bearing sleeve 62 of the revolving shaft 64. Therefore, the rotor 65 on the revolving shaft 64 is fixed (See FIG. 2 and FIG. 3).

A stator coil 66 fitted on the outer periphery of the bearing sleeve 62 to face toward the rotor magnet 65c is fixed on the printed board 40. The magnetic center between the stator coil 66 and the rotor magnet 65c is vertically shifted. Thus, a repulsive force exerts a force that pushes downward (preloaded) on the revolving shaft 64, and the lower end of the revolving shaft 64 is brought into press contact with the thrust bearing 63. Therefore, backlash of the revolving shaft 64 and the backlash of the rotor 65 are prevented. The upper end of the revolving shaft 64 is rotatably received in the bearing 73 formed on the lower surface of the upper half 28 (See FIG. 2 and FIG. 3).

The bearing sleeve 62 is inserted into the insertion hole 42 formed on the printed board 40, the a hall element 74 is disposed on the upper surface of the printed board 40 at the position facing toward the lower end of the rotor magnet 65c (See FIG. 3).

A driving gear 75 is fixed at the upper end of the revolving shaft 64 (See FIG. 2 and FIG. 3).

The stator coil 66 is fixed to the printed board 40 in the following manner.

Figure 7:
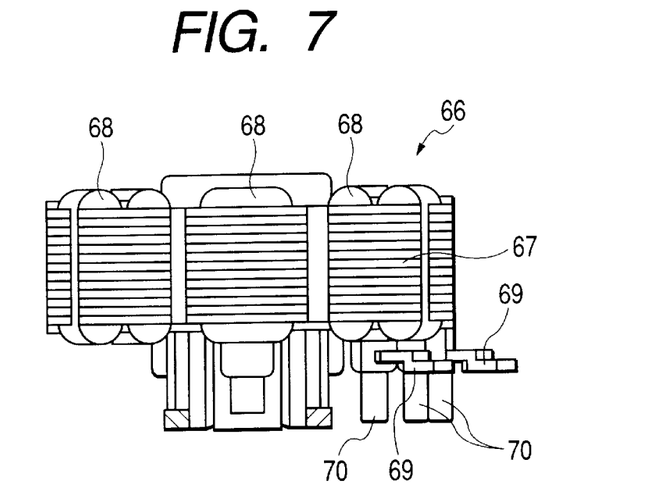
FIG. 7 shows a side view of a stator coil of a motor.
Figure 8:
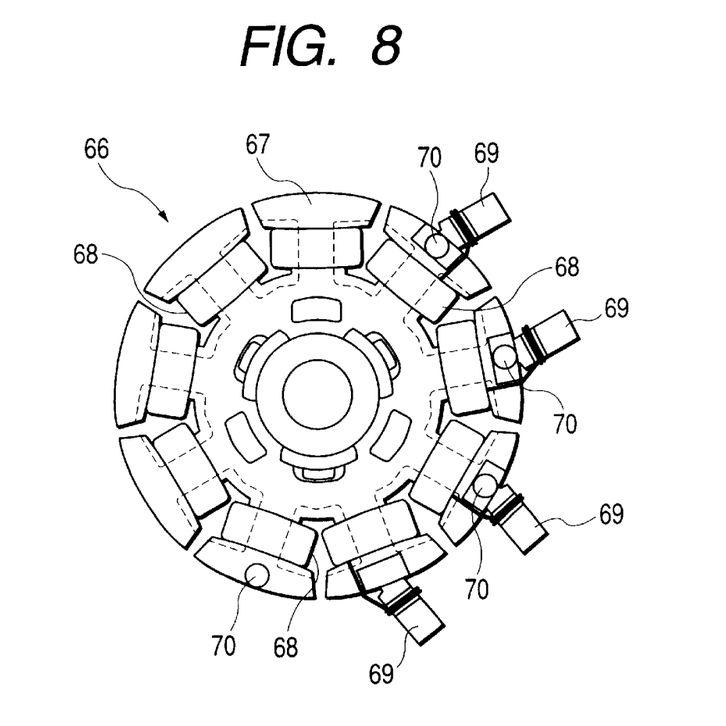
FIG. 8 is a bottom view of FIG. 7.

The stator coil 66 is constructed of winding wires 68 wound on the core 67 in three phases as shown in FIG. 7 and FIG. 8, and the respective winding wires 68 are connected to the contact legs 69 (four contact legs including contact points for supplying a power to the three phases of winding wires 68 and a neutral point) for supplying a power to the winding of each phase. The stator coil 66 is formed with positioning projections 70 projecting downward.

Figure 9:
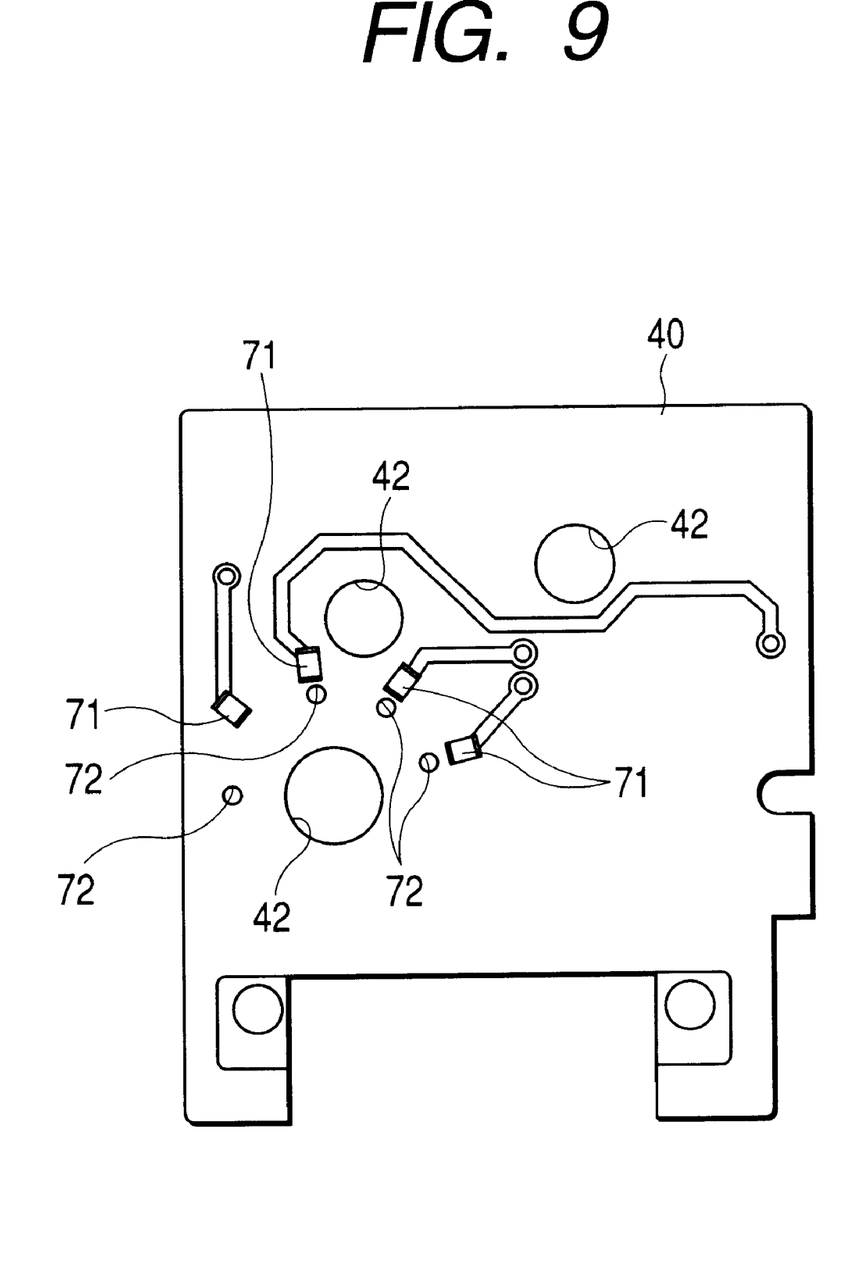
FIG. 9 is a schematic plan view of the printed board according to an embodiment of the invention.

On the other hand, connecting lands 71 and positioning holes 72 are formed on the upper surface of the printed board 40 at the position surrounding the insertion hole 42 through which the bearing sleeve 62 is to be inserted.

Then the positioning projections 70 of the stator coil 66 are inserted into the positioning holes 72 of the printed board 40. Accordingly, the stator coil 66 is positioned with respect to the printed board 40. The respective contact legs 69 are placed on the connecting lands 71 of the printed board 40. Then, the respective contact legs 69 are soldered to the connecting lands 71. The stator coil 66, therefore, is fixed on the printer board 40 and is concurrently connected to the circuit on the printed board 40.

The lower ends of the supporting shafts 76, 77 are respectively press fitted into the bosses 33, 34 for receiving a shaft formed on the lower half 29, and the upper ends of these supporting shafts 76, 77 are respectively supported by the supporting bosses 78, 79 formed on the lower surface of the upper half 28. These supporting shafts 76, 77 are separately inserted into the insertion holes 42 formed on the printed board 40 respectively. Intermediate gears 80, 81 are rotatably supported on the supporting shafts 76, 77 respectively. The intermediate gears 80, 81 respectively includes large gears 80a, 81a and small gears 80b, 81b integrally formed. The large gear 80a of the intermediate gear 80 engages the driving gear 75, and the small gear 80b engages the large gear 81a of the intermediate gear 81, and the small gear 81b of the intermediate gear 81 engages with the sector gear 46 of the output gear portion 44 (See FIG. 3).

The revolving shaft 64 that is the center of rotation of the motor 61 is rotatably supported by the bearing sleeve 62 fixed to the boss 32 for receiving a shaft formed on the case body 12 (lower half 29). Therefore, the gears 75, 80, 81, and 46 can be assembled at the designed distances with each other by fixing the shafts 76, 77, 37, which define the centers of rotation of the driving gear 75 fixed to the revolving shaft 64 of the motor 61, and the respective gears 80, 81, 46 connected to the driving gear 75 to the bosses 33, 34, 31 for receiving a shaft formed on the case body 12 (lower half 29) respectively. Accordingly, since rotation of the motor 61 is smoothly transmitted to the tail end gear 46, there is no loss of rotation of motor 61. Therefore, power consumption is reduced and occurrence of gear sound is reduced so that smooth, quite drive is realized.

When a power is supplied from the power supply, not shown, to the stator coil 66 of the brushless motor 61 via the printed board 40, the rotor 65 rotates, and then the driving gear 75 that is coaxial with the rotor 65 rotates, which in turn rotates the sector gear 46 of the output gear portion 44 via the intermediate gears 80, 81. Therefore, the revolving shaft 16 formed integrally with the output gear portion 44 rotates, and the lamp body 3 also rotates and the direction of irradiation is changed in the horizontal direction.

Even when the lamp body 3 rotates, power feeding to the light source bulb 23 is maintained by sliding contact between the fixed contact points 17 and the rotary contact points 20 having a slap ring construction, and the power supply cable 27 rotates with the lamp body 3 in its entirety. Therefore, no kinking of the power supply cable 27 occurs, and no stress is exerted on the power supply cable 27 with rotation of the lamp body 3. Though shavings may be generated from one of or both of the fixed contact points 17 and the rotary contact points 20 by the sliding contact between the fixed contact points 17 and the rotary contact points 20, the shavings are collected into the recesses 56 formed to surround the fixed contact points 17, and do not fly off around.

Then, as described above, when the lamp body 3 rotates, the rotary disk 39 of the potentiometer 36 simultaneously rotates via the connecting spring 47. Accordingly, the value of resistance supplied from the potentiometer 36 varies, and thus the orientation of the lamp body 3 can be known. To find the orientation of the lamp body 3 accurately from the value of resistance that is supplied by the potentiometer 36, the orientation of the lamp body 3 have to coincide with the position of the rotary disk 39 of the potentiometer 36. In other words, the position of rotation of the rotary disk 39 with respect to the baseboard 38 should be adjusted so that the potentiometer 36 outputs the value of resistance showing the neutral condition when the lamp body 3 is at the neutral position, or when it faces toward the front, for example. On a design basis, the orientation of the lamp body 3 and the orientation of the rotary disk 39 of the potentiometer 36 coincide with each other if they can be assembled as designed. However, the orientation of the lamp body 3 and the orientation of the rotary disk 39 do not necessarily coincide because of the accumulation of tolerances and variations between potentiometers 36. Therefore, so called zero position adjustment of the potentiometer 36 is required such that when the lamp body is located at a neutral position, the value of resistance indicating that the lamp body 3 is at the neutral position (zero position signal).

Figure 6:
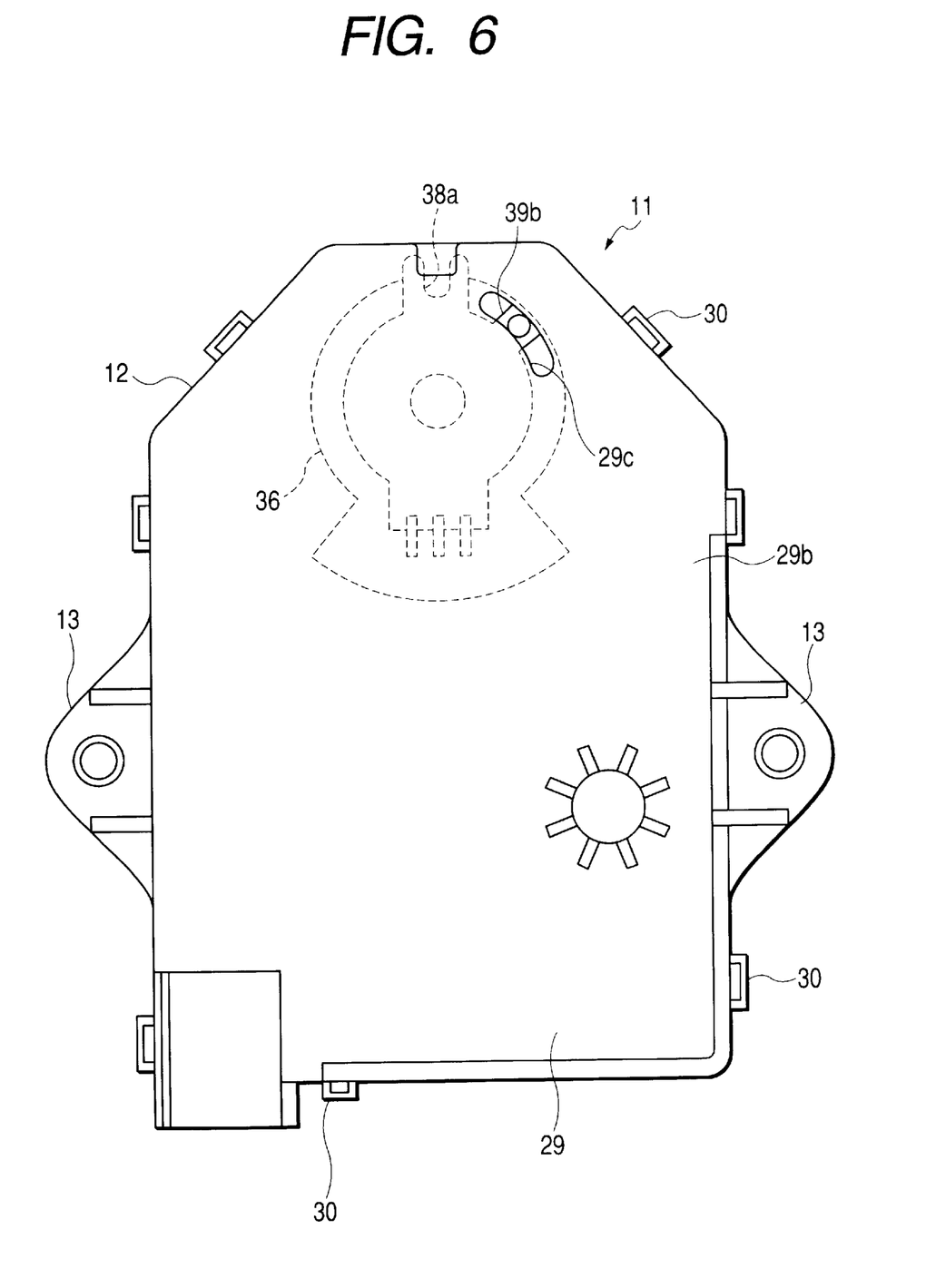
FIG. 6 is a bottom view of the driving unit of FIG. 2.

The motor 61 is driven and rotated to the position where the potentiometer 36 outputs a zero position signal. Then, a jig such as a pin is inserted into the case body 12 from the arc-shaped hole 29c (See FIG. 6) formed on the bottom wall 29b of the lower half 29 of the case body 12 so that the jig is engaged into the hole on the projection 39b for adjustment from the side surface of the rotary disk 39 and for fixing in that state so that the jig does not move. The hole 29c is formed into arc-shape about the axis of the boss 31 for receiving a shaft formed on the lower half 29. As described above, after the projection 39b for adjustment is fixed by the jig, the motor 61 is actuated again to rotate the lamp body 3 so that the lamp body 3 is positioned at the neutral position. Since the rotary disk 39 of the potentiometer 36 cannot be rotated because the position of the projection 39b for adjustment is fixed by the jig, slippage occurs between the rotary disk 39 and the connecting spring 47 (clutch means) and thus only the lamp body 3 rotates. Consequently, the orientation of the lamp body 3 accurately coincides with the orientation of the rotary disk 39 of the potentiometer 36.

In the embodiment described above, a brushless motor is used as a driving source, it may be a motor of the type other than the brushless motor, or it may be a driving source other than the motor, such as a solenoid or the like.

The configurations or constructions of the respective components shown in the embodiment described above are shown simply as an example of embodiments of the present invention, and thus it is to be distinctly understood that the technical field of the present invention is not limited thereto.

As is clear from the described above, the vehicle lamp according to the present invention includes optical means having a light source rotated by the driving unit including a driving source, and the driving unit is provided with a rotational position detecting means including a base member and a rotating body rotatable with respect to the base member for supplying signals corresponding to the rotational positions with respect to the base member of the rotating body. The optical means and the rotating body of the rotational position detecting means are connected by clutch means.

Therefore, the position of the optical means with respect to the rotating body of the rotational position detecting means can be adjusted after assembling the driving unit and the optical means, for example, by fixing the rotating body of the rotational position detecting means to the position where a neutral position signal is supplied, disconnecting the connection between the rotating body and the optical means by the clutch means, rotating the optical means to the neutral position, and subsequently connecting between the optical means and the rotating body of the rotational position detecting means again by the clutch means.

The rotary driving apparatus according to the present invention is a rotary driving apparatus for rotating an optical means having a light source including a rotational position detecting means including a driving source for rotating the rotary means to be connected to the optical means, a base member, and a rotating body rotatable with respect to the base member, for supplying signals corresponding to the rotational positions with respect to the base member of the rotating body. The rotary means and the rotating body of the rotational position detecting means are connected via the clutch means.

Therefore, in the rotary driving apparatus according to the present invention, after the rotary means and the optical means are connected, the position of the optical means with respect to the rotating body of the rotational position detecting means can be adjusted, for example, by fixing the rotating body of the rotational position detecting means to the position where a neutral position signal is supplied, disconnecting the connection between the rotating body and the optical means by the clutch means, rotating the optical means to the neutral position, and subsequently, connecting the optical means and the rotating body of the rotational position detecting means again via the clutch means.

Because the clutch means is connected to the rotating body by being in resilient contact with the rotating body, the position of the optical means with respect to the rotating body can be adjusted simply by allowing the clutch means to slip against friction with respect to the rotating body, and thus adjustment of the position can be simplified.

Furthermore, because the clutch means is connected to the rotating body by being in resilient contact with the rotating body, and concurrently, a part thereof is fixed to the rotary means, the position of the optical means with respect to the rotating body can be adjusted simply by allowing the clutch means to slip against the friction with respect to the rotating body, and thus adjustment of the position can be simplified.

Further still, because the driving source and the rotational position detecting means are accommodated in the case body, and the position of the base member with respect to the case body is defined by engaging the engaging notch formed on the base member of the rotational position detecting means with the engaging projection formed on the case body, the position of the rotational position detecting means is stabilized.

What is claimed is:

1. A vehicle lamp comprising:

optical means including a light source to be rotated by a driving unit having a driving source, wherein the driving unit is provided with a potentiometer comprising a base member and a rotating body being rotatable with respect to the base member, said potentiometer provides signals corresponding to the rotational position of the rotating body with respect to the base member, and the optical means and the rotating body of the potentiometer are connected by a clutch.

2. The vehicle lamp according to claim 1, wherein the clutch is connected to the rotating body by being in resilient contact with the rotating body.

3. The vehicle lamp according to claim 1, wherein the driving source and the potentiometer are accommodated in a case body, and a position of the base member with respect to the case body is defined by engaging an engaging notch formed on the base member of the potentiometer with an engaging projection formed on the case body.

4. The vehicle lamp according to claim 2, wherein the driving source and the potentiometer are accommodated in a case body, and a position of the base member with respect to the case body is defined by engaging an engaging notch formed on the base member of the potentiometer with an engaging projection formed on the case body.

5. A rotary driving apparatus for rotating optical means having a light source comprising:

a driving source for rotating a rotary means to be connected to the optical means; and a potentiometer comprising a base member and a rotating body rotatable with respect to the base member, said potentiometer providing signals corresponding to the rotational positions with respect to the base member of the rotating body, wherein the rotary means and the rotating body of the potentiometer are connected via a clutch.

6. The rotary driving apparatus according to claim 5, wherein the clutch is connected to the rotating body by being in resilient contact with the rotating body, and a part thereof is fixed to the rotary means.

7. The rotary driving apparatus according to claim 5, wherein the driving source and the potentiometer are accommodated in an case body, and a position of the base member with respect to the case body is defined by engaging an engaging notch formed on the base member of the potentiometer with an engaging projection formed on the case body.

8. The rotary driving apparatus according to claim 6, wherein the driving source and the potentiometer are accommodated in an case body, and a position of the base member with respect to the case body is defined by engaging an engaging notch formed on the base member of the potentiometer with an engaging projection formed on the case body.

* * * * *